US011383847B2

(12) United States Patent
Werjefelt et al.

(10) Patent No.: US 11,383,847 B2
(45) Date of Patent: Jul. 12, 2022

(54) EMERGENCY VISION APPARATUS WITH HAND ACCESS

(71) Applicants: Bertil R. L. Werjefelt, Kaneohe, HI (US); Christian Werjefelt, Kaneohe, HI (US); Alexander K. Werjefelt, Kaneohe, HI (US)

(72) Inventors: Bertil R. L. Werjefelt, Kaneohe, HI (US); Christian Werjefelt, Kaneohe, HI (US); Alexander K. Werjefelt, Kaneohe, HI (US)

( * ) Notice: Subject to any disclaimer, the term of this patent is extended or adjusted under 35 U.S.C. 154(b) by 78 days.

(21) Appl. No.: 15/444,731

(22) Filed: Feb. 28, 2017

(65) Prior Publication Data
US 2017/0267362 A1    Sep. 21, 2017

Related U.S. Application Data

(60) Provisional application No. 62/309,681, filed on Mar. 17, 2016.

(51) Int. Cl.
*B64D 25/00* (2006.01)
*B64D 43/00* (2006.01)
(Continued)

(52) U.S. Cl.
CPC ............. *B64D 25/00* (2013.01); *B64D 43/00* (2013.01); *B64D 45/00* (2013.01); *G02B 27/04* (2013.01);
(Continued)

(58) Field of Classification Search
CPC ........ B64D 45/00; B64D 25/00; B64D 43/00; B64D 47/00; B64D 2045/0075;
(Continued)

(56) References Cited

U.S. PATENT DOCUMENTS 2,803,370 A    8/1957    Lennard
3,060,819 A    10/1962    Tohill
(Continued)

FOREIGN PATENT DOCUMENTS

EP    0411794 A1    2/1991
JP    H1130487    2/1999

OTHER PUBLICATIONS

The International Bureau of WIPO, International Search Report and Written Opinion of the International Searching Authority, dated May 19, 2017, PCT/US17/19867.

*Primary Examiner* — Jade R Chwasz
(74) *Attorney, Agent, or Firm* — Shlesinger, Arkwright & Garvey LLP

(57) ABSTRACT

An emergency vision apparatus comprises an inflatable enclosure to enable a user to see through the enclosure when expanded and observe a source of information at a distal end of the enclosure while smoke or other particulate matter is in the environment. The enclosure includes an opening configured for insertion of a user's hand into the interior of the enclosure to allow the user to operate a touch sensitive screen or hardware visible through the second clear member disposed toward a user and a sealable closure for closing the opening and sealing the opening around the user's hand. The sealable closure includes flexible first and second sheets covering the opening, the first and second sheets including respective first and second slits disposed transversely to each other, the first and second slits being configured to allow insertion of the user's hand into the interior of the enclosure.

6 Claims, 7 Drawing Sheets

(51) Int. Cl.
  *B64D 45/00* (2006.01)
  *G02B 27/04* (2006.01)
  *G02B 27/01* (2006.01)

(52) U.S. Cl.
  CPC ............... *B64D 2045/0075* (2013.01); *G02B 2027/0167* (2013.01)

(58) Field of Classification Search
  CPC ........ B64C 27/006; G02B 27/04; G02B 7/00; G02B 27/0006
  USPC ........................................................ 359/894
  See application file for complete search history.

(56) References Cited

U.S. PATENT DOCUMENTS

| | | | |
|---|---|---|---|
| 4,331,254 A | | 5/1982 | Haggerty |
| 5,851,790 A | | 12/1998 | Walker et al. |
| 5,976,871 A | * | 11/1999 | Walker ................. B01L 1/04 312/1 |
| 6,241,328 B1 | | 6/2001 | Ziff |
| 8,152,016 B2 | | 4/2012 | Berndt |
| 8,302,798 B2 | * | 11/2012 | Moss ................ B65D 43/0212 220/229 |
| 8,705,189 B2 | | 4/2014 | Werjefelt |
| 2012/0170873 A1 | * | 7/2012 | Mathews ............... B65B 33/24 383/33 |
| 2013/0107388 A1 | | 5/2013 | Werjefelt |
| 2013/0308260 A1 | | 11/2013 | Stevenson |

* cited by examiner

EMERGENCY VISION APPARATUS WITH HAND ACCESS

RELATED APPLICATION

This is a nonprovisional application of provisional application Ser. No. 62/309,681, filed Mar. 17, 2016, hereby incorporated by reference.

FIELD OF THE INVENTION

The present invention relates generally to an apparatus to enable an operator to maintain visual contact with instruments or other visual sources of data after smoke and/or particulate from a fire or other sources has invaded the operator's environment. In particular, the present invention relates to an emergency vision apparatus that includes an inflatable enclosure that bridges the gap between a pilot and the windshield and/or instrument panel of an aircraft along the pilot's line of sight and provides a clear viewing path to the windshield and/or the instrument panel and access to manipulate touch sensitive displays, switches and other hardware, thereby providing him with vital information for guiding the aircraft to a safe landing after smoke and/or particulate matter invades the cockpit area.

SUMMARY OF THE INVENTION

The present invention provides an emergency vision apparatus, comprising an inflatable enclosure being made of airtight material and having an expanded form when deployed and a deflated form when not in use; first and second clear members disposed at respective first and second ends of the first enclosure to enable a user to see through the enclosure when expanded and observe a source of information at a distal end of the enclosure while smoke or other particulate matter is in the environment. The enclosure includes an opening configured for insertion of a user's hand into the interior of the enclosure to allow the user to operate a touch sensitive screen or hardware visible through the second clear member disposed toward a user and a sealable closure for closing the opening and sealing the opening around the user's hand. The sealable closure includes flexible first and second sheets covering the opening, the first and second sheets including respective first and second slits disposed transversely to each other, the first and second slits being configured to allow insertion of the user's hand into the interior of the enclosure.

The present invention also provides an emergency vision apparatus, comprising an inflatable enclosure being made of airtight material and having an expanded form when deployed and a deflated form when not in use; first and second clear members disposed at respective first and second ends of the first enclosure to enable a user to see through the enclosure when expanded and observe a source of information at a distal end of the enclosure while smoke or other particulate matter is in the environment. The enclosure including wall opening configured for insertion of a user's hand into the interior of the enclosure to allow the user to operate a touch sensitive screen or hardware visible through the second clear member disposed toward a user and a sealable closure for closing the wall opening and sealing the wall opening around the user's hand. The sealable closure includes a flexible tube with first and second ends including first and second openings disposed at respective the first and second ends, the first end opening encompassing the wall opening, the second opening being configured to allow the user's thumb and index finger together to extend through the opening.

DETAILED DESCRIPTION OF THE INVENTION

Figure 1:
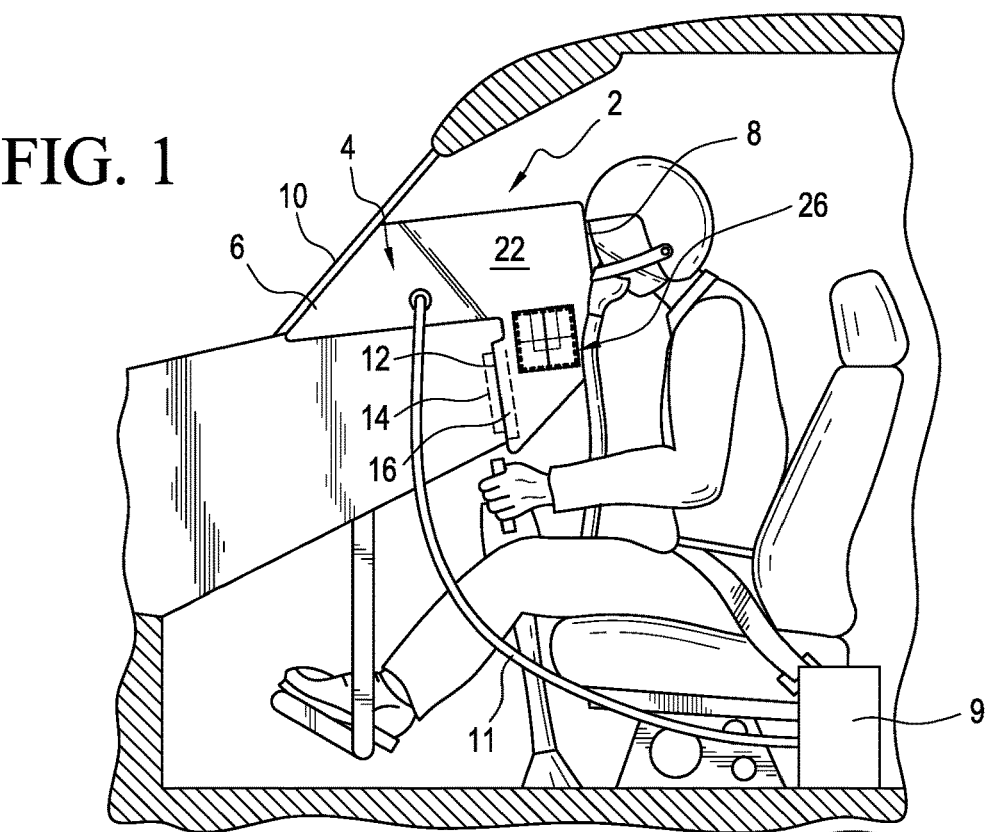
FIG. 1 is a side elevational view of an emergency vision apparatus in use in an aircraft cockpit during a smoke emergency.
Figure 2:
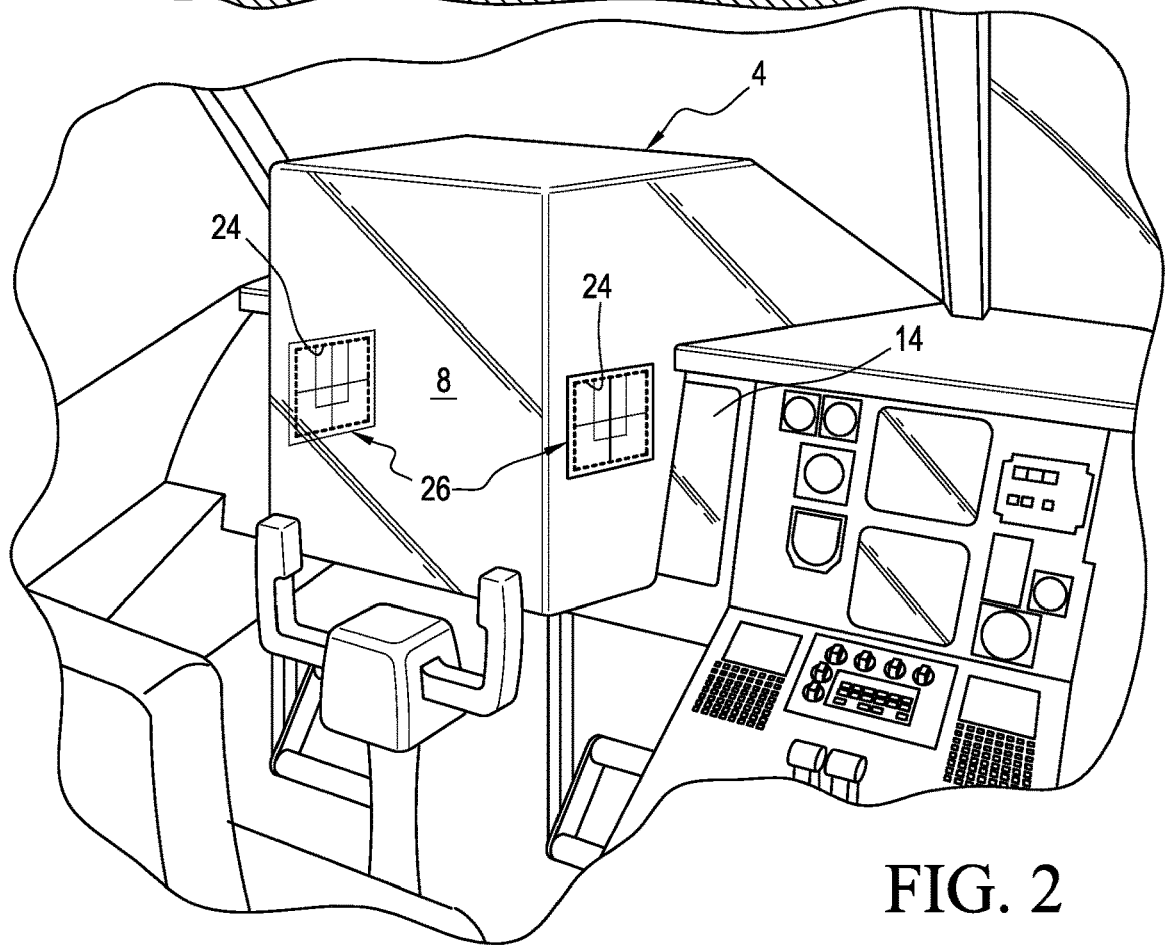
FIG. 2 a rear perspective views of the apparatus shown in FIG. 1.
Figure 3:
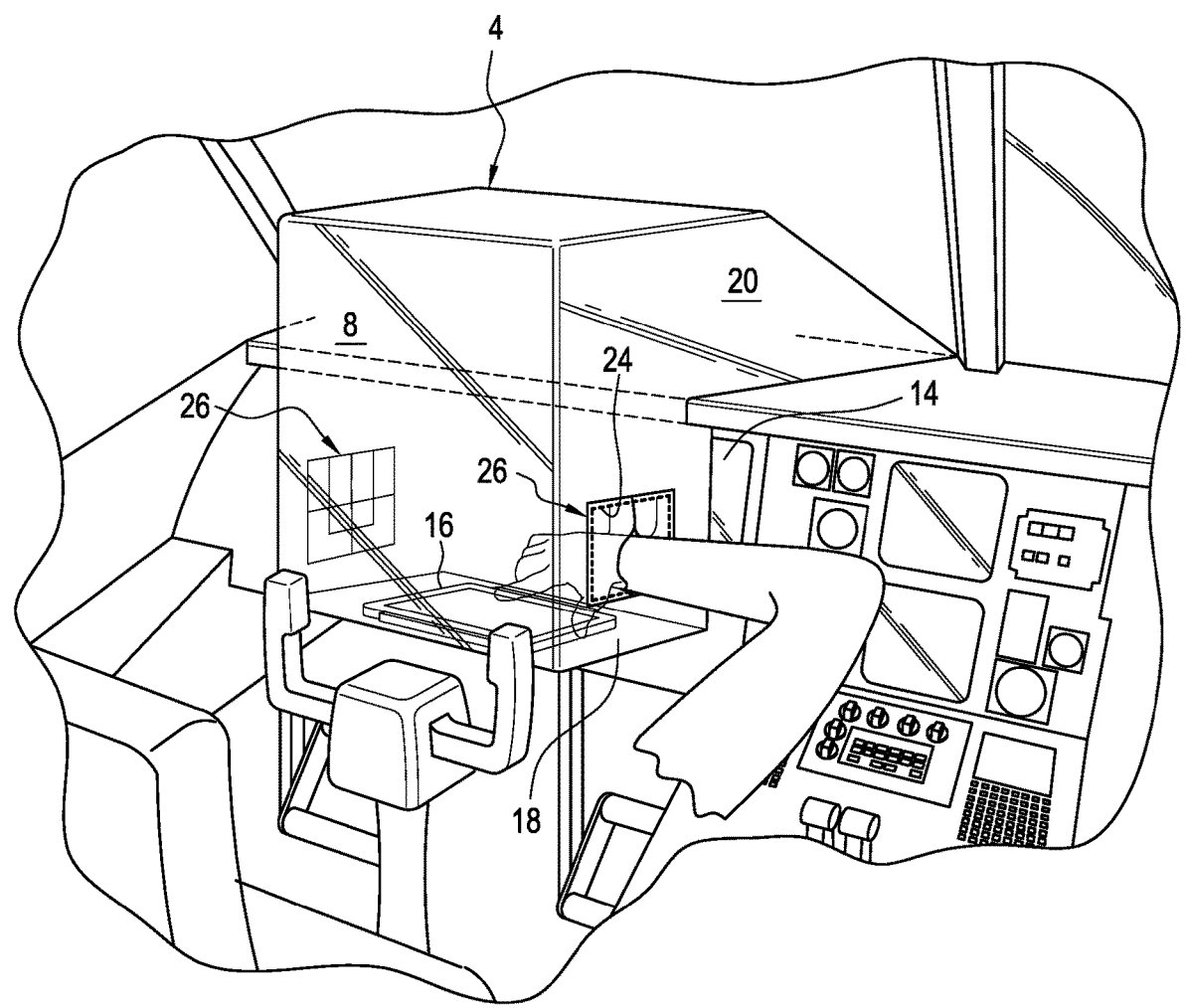
FIG. 3 is a rear perspective view of the apparatus of FIG. 1, showing a user's hand inserted inside the apparatus.

An emergency vision apparatus 2 embodying the present invention is disclosed in FIGS. 1, 2 and 3. The apparatus 2 includes an inflatable enclosure 4 made of airtight material, which is foldable and pliable and having an expanded form when deployed, as shown in FIGS. 1-3, and a deflated form when not in use, as generally disclosed in U.S. Pat. Nos. 5,318,250, 5,947,415, 8,453,969 or 8,705,189, hereby incorporated by reference. The material may be made of foldable and pliable material, such as plastic, airtight fabric or other similar materials. The enclosure 4 has opposing deformable and pliable clear members 6 and 8 to enable a user to see through the clear member 8 and observe a source of information in front of the clear member 6 through the windshield 10 during a smoke emergency when there is vision-obscuring smoke or other particular matter in the environment.

A blower inside a housing 9 is operably connected to the enclosure 4 with a hose 90. The blower inflates the enclosure 4 from a deflated folded form and maintains the enclosure 4 inflated during use. A filter (not shown) is disposed within the housing 9 to filter the particulate matter from within the cockpit during a smoke emergency so that clear air is pumped into the interior of the enclosure 4. The enclosure 4 when not in use is deflated and stored inside the housing 88 along with the hose 11.

Another clear member 12 is provide below the clear member 8 to allow the user to observe another source of information, such as provided by an instrument panel 14, which may be in the form of a touch screen display panel. The instrument panel 14 may be mirrored on a separate tablet PC 16, such as the APPLE IPAD (registered trademark) PC. The tablet PC 16 may also contain information normally carried inside a pilot's flight bag. Other sources of information may include hardware, such as a toggle switch, selector knob, etc., visible through the clear member 12. The tablet 16 may be placed outside or inside the enclosure 4.

Referring to FIG. 3, yet another clear member 18 disposed horizontally or at an angle rising toward the instrument panel may be provided to allow placement of the tablet 16 directly below the clear member 18. The sidewalls 20 and 22 may be made of clear or translucent material to advantageously allow ambient lighting to enter the interior of the enclosure 4.

The enclosure 4 has an opening 24 configured to allow a user's hand to be inserted inside the enclosure and to operate touch sensitive areas on the instrument panel 14 or on the tablet 16 or to operate any toggle switches. A sealable closure 26, as will be described below, allows for the opening and closing of the opening 24. Although two openings 24 and their respective closures 26 are shown, one opening and the associated closure will suffice, placed either on the left or right of the device, depending on the preference of the user.

Figure 4:
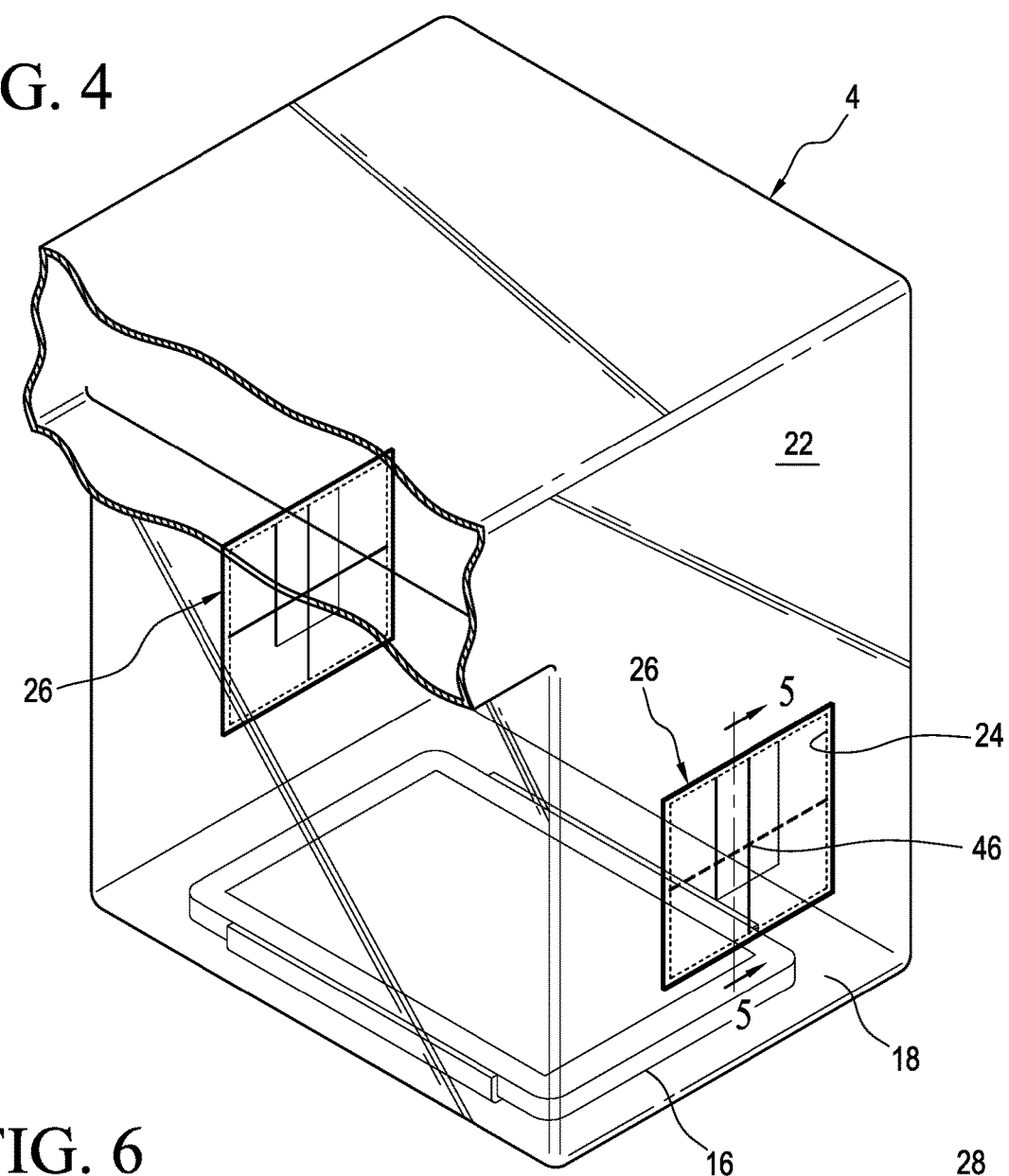
FIG. 4 is a perspective view of the apparatus shown in FIG. 3 with portions broken away.
Figure 6:
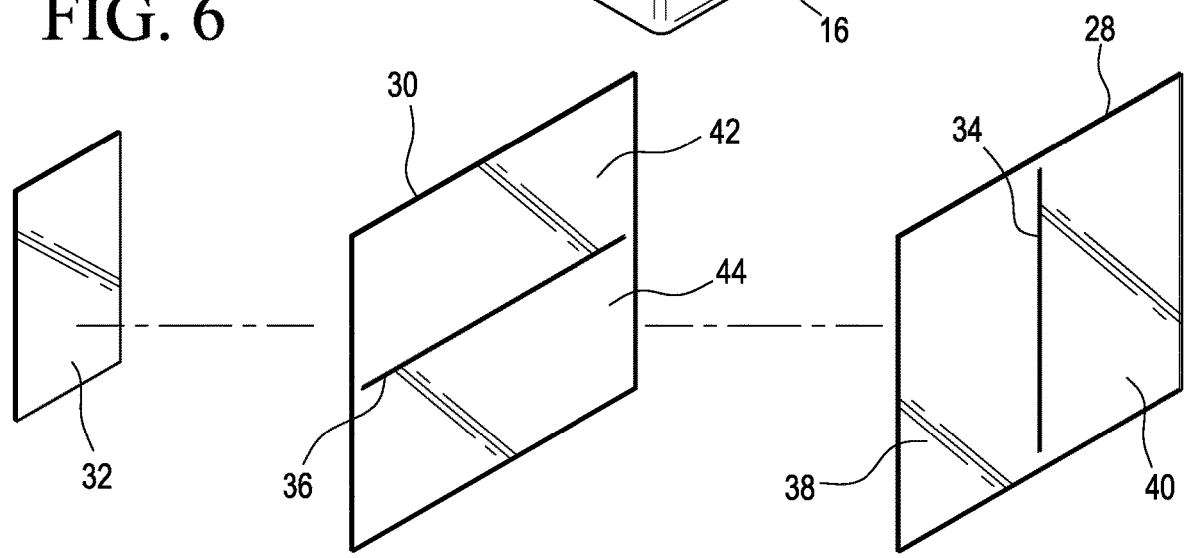
FIG. 6 is an assembly view of a closure for an opening embodying the present invention.
Figures 5, 7:
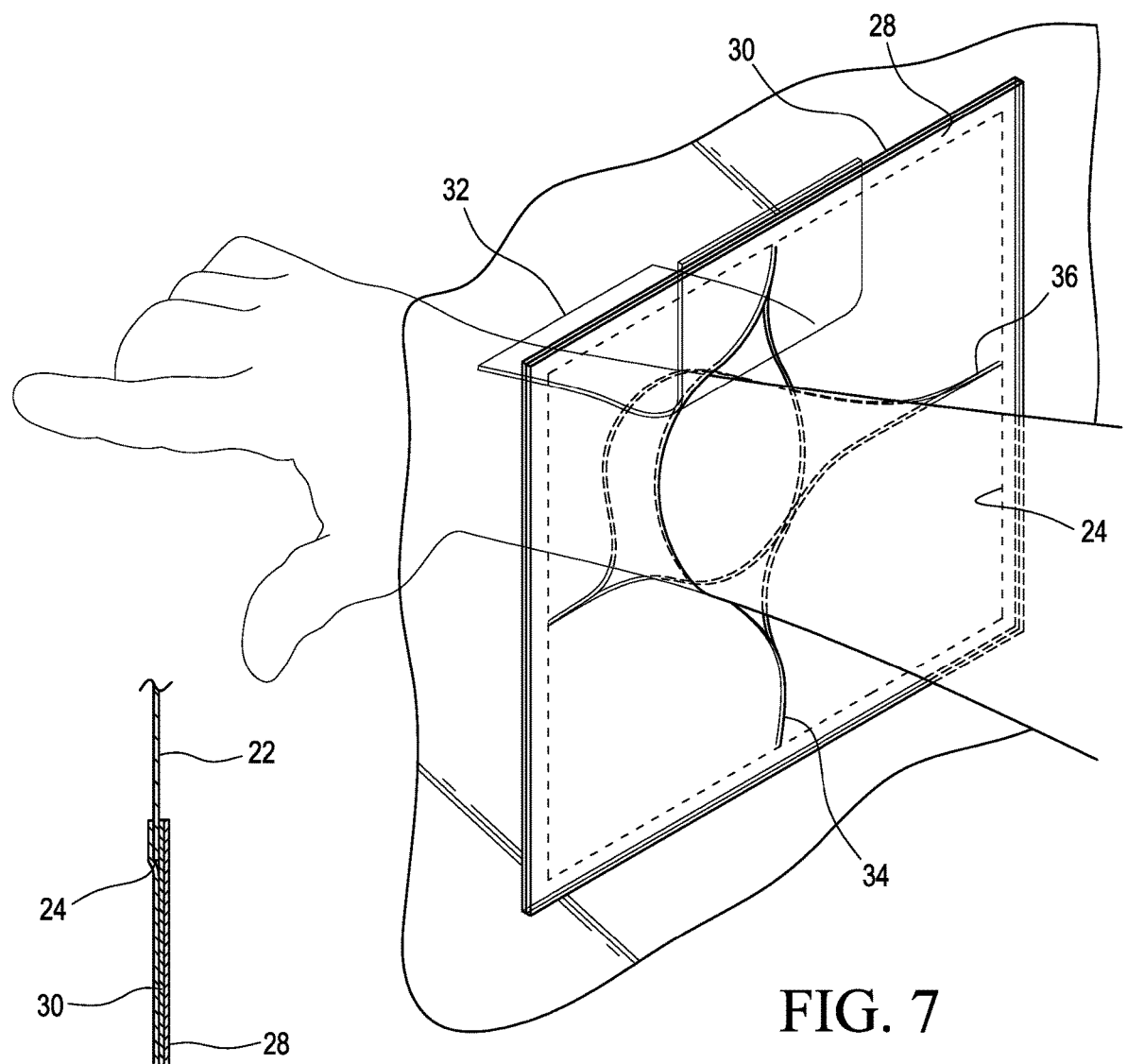
FIG. 5 is a cross-sectional view taken along line 5-5 in FIG. 4.
FIG. 7 is a perspective view of the closure of FIG. 6 showing a user's hand inserted therethrough.

Referring to FIGS. 4-6, the closure 26 will now be described in detail. The closure 26 comprises a plurality of overlapping flexible sheets 28, 30 and 32. The sheets 28-30 are attached to the respective sidewalls 20 and 22 adjacent to the periphery of the opening 24 by stitching or other standard means. The sheets 28-32 are shown as transparent or translucent, but it should be understood that they could also be opaque. The sheets 28-32 are preferably same of the same material as the enclosure 4 that is foldable and pliable. The sheets 28-32 may also be made of stretchable or elastic material, such as rubber sheets.

Each of the sheets 28 and 30 includes respective cuts or slits 34 and 36. The slit 34 divides the sheet 28 into a left half portion 38 and a right half portion 40. Similarly, the slit 36 divides the sheet 30 into an upper half portion 42 and a lower half portion 44. The slits 34 and 36 preferably do not extend across the entire width of the respective sheets 28 and 30 for ease of manufacture.

The sheet 30 is placed over the opening 24 to cover the entire opening 24. The sheet 28 is then placed over the sheet 30, with the slit 34 being transverse to the slit 36. Preferably, the slit 34 is disposed perpendicular to the slit 36. With this arrangement, the slits 34 and 36 are closed off by the respective adjacent overlying or underlying portions 38, 40, 42 and 44, except where the slits 34 and 36 intersect at point 46. To minimize any air escape through the point 46, the sheet 32 may be attached to the sheet 30 or the wall 20 to overlie the point 46. Due to the air pressure within the enclosure 4 generated by the blower inside the housing 9, the sheet 30 will tend to press against the sheet 28, thereby sealing the slits 34 and 36. Any air leakage through the point 46 will be compensated by the blower inside the housing 9. The sheet 32, if provided, will also press against the sheet 30, thereby sealing the point 46. Although shown smaller, the sheet 32 may be made to the same size as the other sheets 28 and 30 and attached to the respective sidewall 22 and 20.

Referring to FIG. 7, the sheets 28 and 30 are preferably made of flexible material, such as plastic sheets, or stretchable or elastic material, such as rubber material or other materials to allow insertion of the user's hand through the slits 34 and 36 provide a seal around the user's arm when inserted through the opening 24. The edges of the sheets 28 and 30 along the slits 34 and 36 will flex around the user's arm, thereby creating a seal around the arm of the user to reduce the escape of gas from within the enclosure 4.

Referring back to FIG. 5, when the arm is removed from the opening 24, the sheets 28 and 30 will revert to their original position to seal the opening 24. With the positive pressure inside the enclosure 4 generated by the blower inside the housing 9 relative to the outside, the underlying sheet 30 will push out against the overlying sheet 28, thereby creating a seal over the slits 34 and 36 to reduce the escape of air from inside the enclosure 4. The multiple overlapping portions 38-44 advantageously increase the sealing power of the closure 26. The sheet 32 will also push against the sheet 30, sealing the point 46.

An assembly view of the closure 26 is disclosed in FIG. 6. The left and right half portions 38 and 40 will overlap the slit 36. In the same manner, the upper and lower half portions 42 and 44 will underlie the slit 34. This arrangement advantageously seals the slits 34 and 36. The sheet 32 will underlie the point 46, advantageously providing additional seal to the slits 34 and 36.

With the user's bare hand inside the enclosure 4, the user has advantageously better control in manipulating the display 16 or the instrument panel 14.

Figure 8:
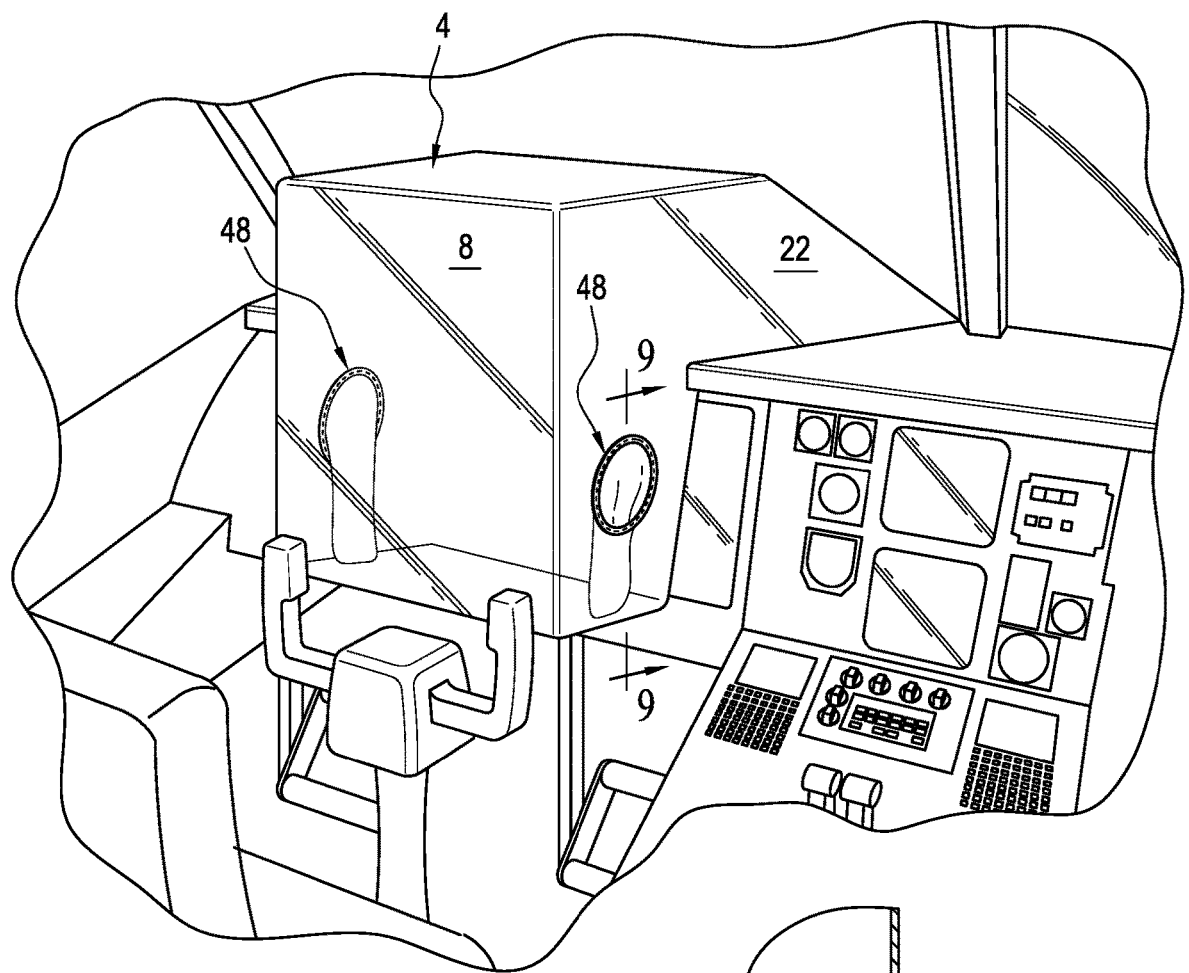
FIG. 8 is front perspective view of the apparatus of FIG. 1 showing another embodiment of a closure for an opening embodying the present invention.
Figure 9:
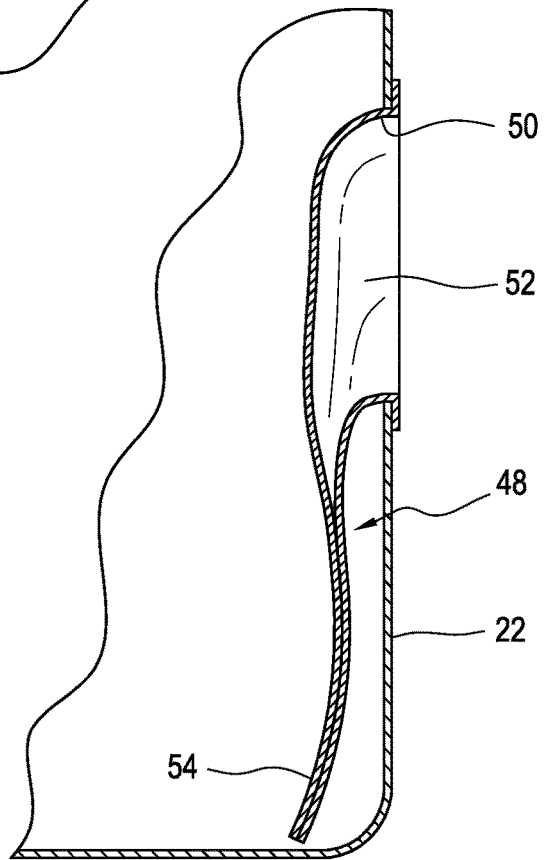
FIG. 9 is a cross-sectional view taken along line 9-9 in FIG. 8.

Referring to FIGS. 8 and 9, another embodiment of a closure 48 for an opening 50 into the interior of the enclosure 4 is disclosed. The closure 48 is tubular, open at both ends 52 and 54, and made of a flexible material that folds flat when empty of the user's hand from the action of the positive air pressure in the enclosure 4 generated by the blower inside the housing 9. The closure 48 will, therefore, seal off the opening 50 when not in use and thus minimize the air inside the enclosure 4 from escaping to the outside.

Figure 10:
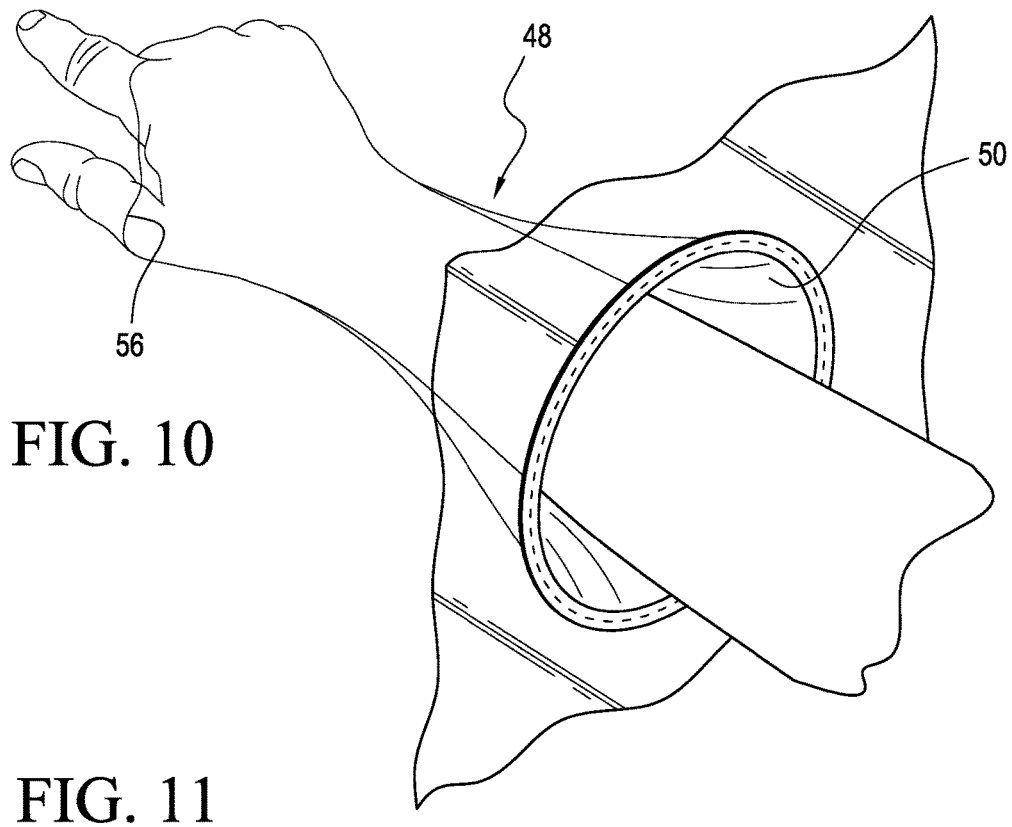
FIG. 10 show the hand of a user inserted through closure of FIG. 8.

Referring to FIG. 10, the closure 48 is configured to be loose around the forearm of the user, but closely fitting around the user's first to seal the opening 56 and minimize air escaping from the interior of the enclosure 4 to the outside. The user's first and the rest of the hand will serve to seal the opening 56 during use.

Figure 11:
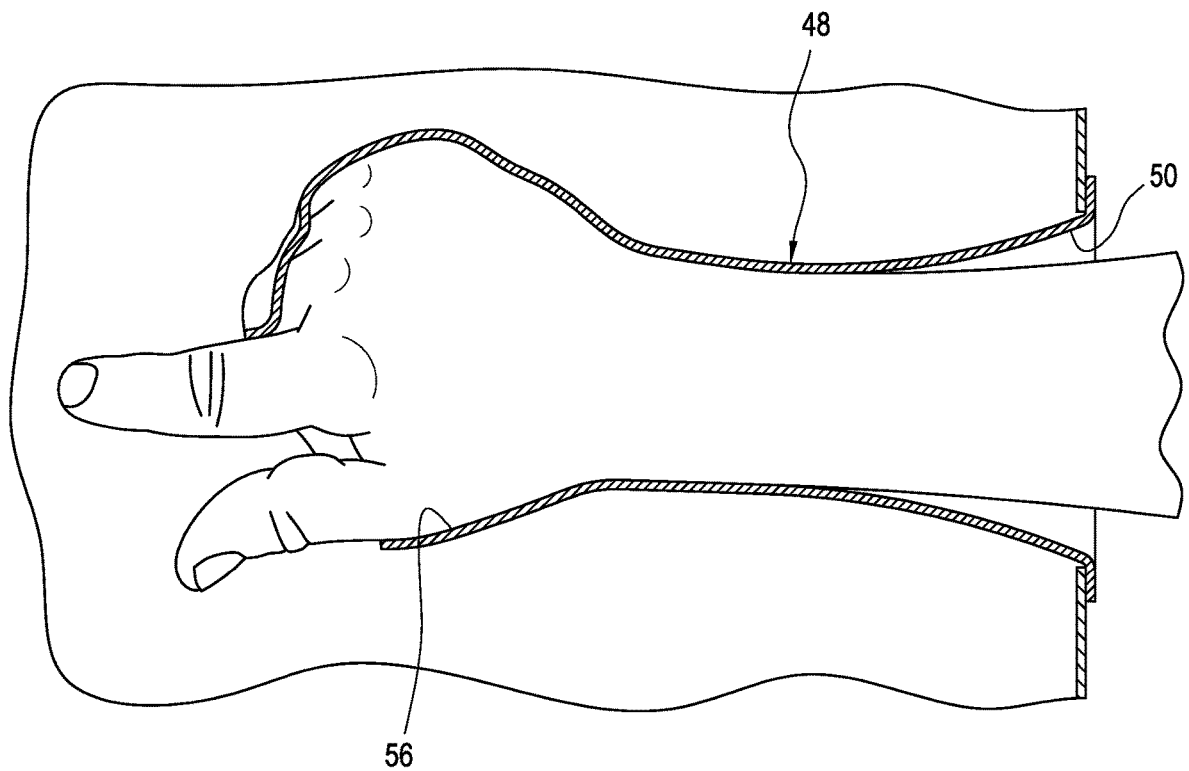
FIG. 11 is cross-sectional view of the closure of FIG. 8, showing the user's thumb and index finger extending through a smaller opening at a far end of the closure.

Referring to FIG. 11, the closure 48 may be made of stretchable material, such as that used for making socks, so as to make a close fitting around the user's first and forearm to seal the opening 56 and minimize air escaping from the interior of the enclosure 4 to the outside.

The opening 50 is large enough to receive the user's hand. An opening 56 at the end 54 is only large enough to allow the user's thumb and index finger to extend outwardly through the opening 56. The user's thumb and index finger are then available to manipulate the touch sensitive screen of the tablet 16 or the instrument panel 14.

Figure 12:
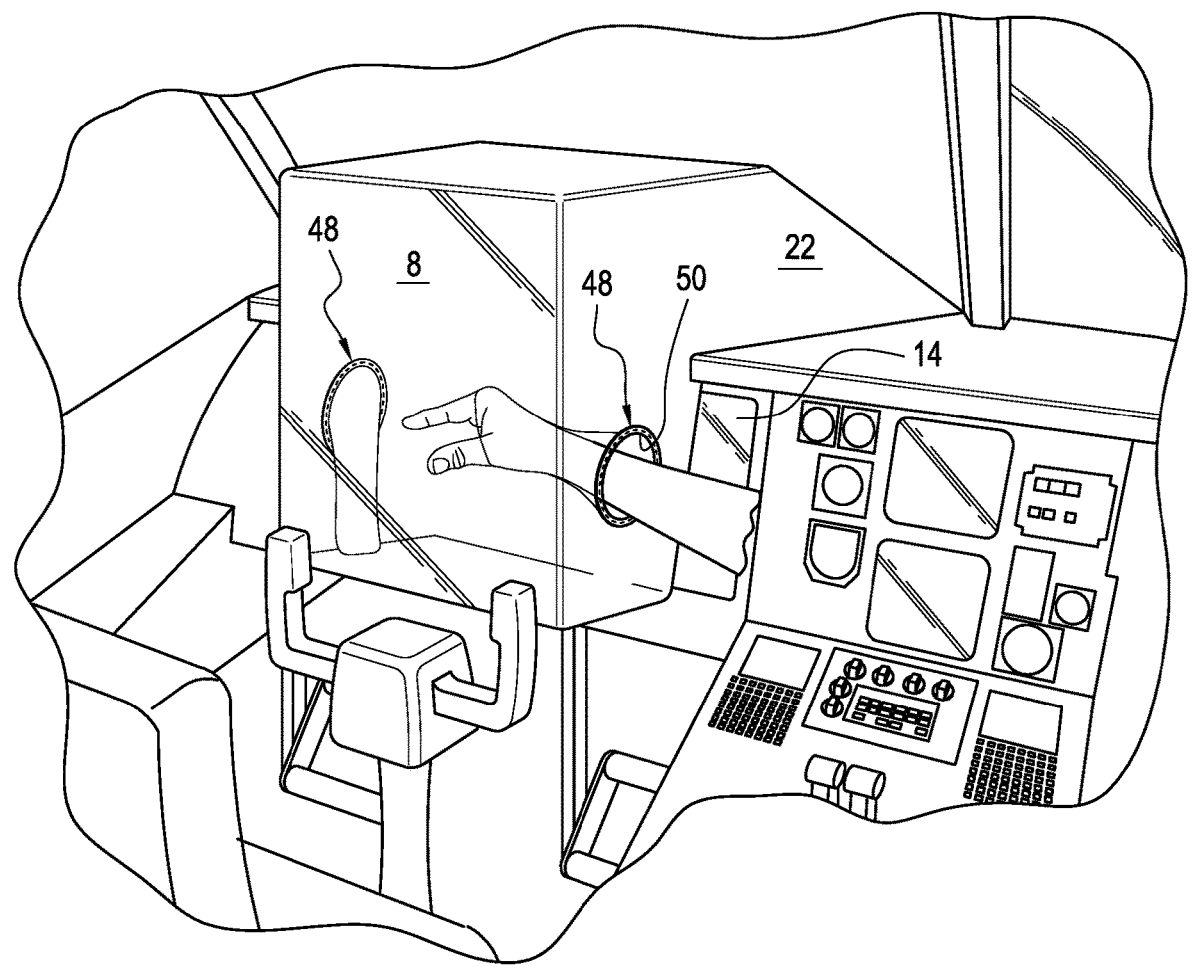
FIG. 12 is a front perspective view of the apparatus of FIG. 1 with the closure of FIG. 8, showing the user's thumb and index finger inside the apparatus.

Referring to FIG. 12, the closure 48 advantageously provides the user to reach the instrument panel 14 or the tablet 16 (see FIG. 3).

Although the present invention has been described in the environment of an aircraft cockpit, it should be understood that it would be equally applicable to other settings, such as in a submarine control station, a nuclear power plant control room or any other environments where the need exists for an operator to continue to operate in case of smoke in the room that obliterates the visibility between the operator and the control panel. For example, the instrument or control panel may be disposed in an operator station within a control room in a submarine, nuclear power plant, or other critical areas. In this case, to continue to operate, the operator must have visual access to the instrument or control panel in case smoke invades the operator station. In addition, the need to operate hardware, such as switches, touch sensitive displays, knobs, etc. while smoke is in the environment is addressed by the closable opening and sealable closure described in the present invention.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. An emergency vision apparatus, comprising:
   a) an inflatable enclosure being made of airtight material and having an expanded form with an interior volume when deployed and a deflated form when not in use;
   b) first and second clear members disposed at respective first and second ends of said enclosure to enable a user to see through said enclosure when expanded and observe a source of information at a distal end of said enclosure while smoke or other particulate matter is in the environment;
   c) said enclosure including an opening configured for insertion of the user's hand into an interior of said enclosure to allow the user to operate a touch sensitive screen or hardware visible through said second clear member disposed toward the user;
   d) a sealable closure for closing said opening and sealing said opening around the user's hand while disposed in the opening to seal said interior volume from outside of said enclosure; and
   e) said sealable closure including a flexible first sheet and a flexible second sheet, said first sheet is disposed over said opening to cover said opening, said first sheet including a first central portion with a first slit, said second sheet is disposed overlying said first sheet, said second sheet including a second central portion with a second slit disposed transversely over said first slit, said first slit and said second slit for allowing insertion of the user's hand into the interior of said enclosure.

2. An emergency vision apparatus as in claim 1, wherein said first and second sheets are stretchable.

3. An emergency vision apparatus as in claim 1, and further comprising a third sheet disposed within said enclosure overlying an intersection of said first and second slits.

4. An emergency vision apparatus, comprising:
   a) an inflatable enclosure being made of airtight material and having an expanded form with an interior volume when deployed and a deflated form when not in use;
   b) first and second clear members disposed at respective first and second ends of said enclosure to enable a user to see through said enclosure when expanded and observe a source of information at a distal end of said enclosure while smoke or other particulate matter is in the environment;
   c) said enclosure including a wall opening configured for insertion of the user's hand into an interior of said enclosure to allow the user to operate a touch sensitive screen or hardware visible through said second clear member disposed toward the user;
   d) a sealable closure for closing said wall opening and sealing said wall opening around the user's hand while disposed in said wall opening to seal said interior volume from outside of said enclosure; and
   e) said sealable closure including a flexible tube with first and second ends including first and second openings disposed at respective said first and second ends, said first opening encompassing said wall opening, said second opening being configured to allow the user's thumb and index finger together to extend through said second opening, said flexible tube folds flat when empty of the user's hand to seal off said wall opening.

5. An emergency vision apparatus as in claim 4, wherein said tube is stretchable.

6. An emergency vision apparatus as in claim 4, wherein said second opening is smaller than said first opening.

* * * * *